US007225237B1

(12) United States Patent
Tenereillo (10) Patent No.: US 7,225,237 B1
(45) Date of Patent: May 29, 2007

(54) SYSTEM AND METHOD FOR PROVIDING PERSISTENT CONNECTIONS BASED ON SUBNET NATURAL CLASS (75) Inventor: Peter Tenereillo, Vista, CA (US)

(73) Assignee: Cisco Technology, Inc., San Jose, CA (US)

(*) Notice: Subject to any disclaimer, the term of this patent is extended or adjusted under 35 U.S.C. 154(b) by 608 days.

(21) Appl. No.: 09/629,036

(22) Filed: Jul. 31, 2000

(51) Int. Cl.
G06F 13/00 (2006.01)
(52) U.S. Cl. .................. 709/219; 709/203; 709/217; 709/223; 709/225; 709/238; 370/392; 718/105
(58) Field of Classification Search ........ 709/217–219, 709/225, 203, 238, 223; 370/392; 718/105
See application file for complete search history.

(56) References Cited

U.S. PATENT DOCUMENTS

| 5,774,660 | A  | * | 6/1998  | Brendel et al. ........... 709/201 |
| 6,185,623 | B1 | * | 2/2001  | Bailey et al. ............ 709/238 |
| 6,272,523 | B1 | * | 8/2001  | Factor .................. 709/201 |
| 6,327,622 | B1 | * | 12/2001 | Jindal et al. ............ 709/228 |
| 6,330,602 | B1 | * | 12/2001 | Law et al. .............. 709/224 |
| 6,445,704 | B1 | * | 9/2002  | Howes et al. ............ 709/203 |
| 6,473,802 | B2 | * | 10/2002 | Masters ................. 709/229 |
| 6,549,516 | B1 | * | 4/2003  | Albert et al. ........... 709/203 |
| 6,581,104 | B1 | * | 6/2003  | Bereiter ................ 709/232 |
| 6,643,274 | B2 | * | 11/2003 | D'Annunzio ............. 370/316 |
| 6,650,641 | B1 | * | 11/2003 | Albert et al. ........... 370/392 |
| 6,665,702 | B1 | * | 12/2003 | Zisapel et al. .......... 709/223 |
| 6,735,631 | B1 | * | 5/2004  | Oehrke et al. ........... 709/226 |
| 6,754,706 | B1 | * | 6/2004  | Swildens et al. ......... 709/225 |
| 6,779,039 | B1 | * | 8/2004  | Bommareddy et al. ...... 709/238 |
| 2001/0047415 | A1 | * | 11/2001 | Skene et al. ............ 709/226 |
| 2001/0049741 | A1 | * | 12/2001 | Skene et al. ............ 709/232 |

OTHER PUBLICATIONS

"ASP and Web Session Management;"MSDN Online Web Workshop, Michael P. Levy, Microsoft Consulting Services, Apr. 2, 1997.

* cited by examiner

Primary Examiner—Jeffrey Pwu
Assistant Examiner—Alina Boutah
(74) Attorney, Agent, or Firm—Cindy Kaplan (57) ABSTRACT

A method for providing a persistent connection between a client and a real server. The method includes receiving a request originating from a client for connection to a virtual server and selecting a real server associated with the virtual server for connection with the client based only on a natural class of an IP address of a device sending the request. Transmissions originating from the client are forwarded to the selected real server.

9 Claims, 5 Drawing Sheets

| IP Address Class | Purpose | Address Range |
|---|---|---|
| A | Few large organizations | 1.0.0.0 to 126.0.0.0 |
| B | Medium-size organizations | 128.1.0.0 to 191.254.0.0 |
| C | Relatively small organizations | 192.0.1.0 to 223.255.254.0 |
| D | Multicast groups (RFC 1112) | 224.0.0.0 to 239.255.255.255 |
| E | Experimental | 240.0.0.0 to 254.255.255.255 |

SYSTEM AND METHOD FOR PROVIDING PERSISTENT CONNECTIONS BASED ON SUBNET NATURAL CLASS

BACKGROUND OF THE INVENTION

The present invention relates generally to persistent (or "sticky") server connections, and more specifically, persistent connections based on the natural class of a subnet.

Applications that communicate over the Internet typically communicate with each other over a transport layer Transmission Control Protocol (TCP) or User Datagram Protocol (UDP) connection. TCP/IP is an industry standard suite of protocols designed for large internetworks spanning wide area network (WAN) links. TCP/IP was developed in 1969 by the U.S. Department of Defense Advanced Research Projects Agency (DARPA), the result of a resource-sharing experiment called ARPANET (Advanced Research Projects Agency Network). The purpose of TCP/IP was to provide high speed communication network links. DARPA and other government organizations understood the potential of packet-switched technology and were just beginning to discover that virtually all companies with networks needed to support communication among dissimilar computer systems. With the goal of heterogeneous connectivity in mind, DARPA funded research by Stanford University and Bolt, Beranek, and Newman to create a series of communication protocols. The result of that development effort was the Internet protocol suite, of which the Transmission Control Protocol (TCP) and the Internet Protocol (IP) are the two best-known members.

TCP is a connection-orientated transport layer protocol that sends data as an unstructured stream of bytes. By using sequence numbers and acknowledgment messages, TCP can provide a sending node with delivery information about packets transmitted to a destination node. Where data has been lost in transit from source to destination, TCP can retransmit the data until either a timeout condition is reached or until successful delivery has been achieved. TCP can also recognize duplicate messages and will discard them appropriately. If the sending computer is transmitting too fast for the receiving computer, TCP can employ flow control mechanisms to slow data transfer. TCP can also communicate delivery information to the upper-layer protocols and applications it supports. As a result of these capabilities, TCP is a connection oriented protocol.

IP is the primary network layer protocol in the Internet suite. In addition to internetwork routing, IP provides error reporting and fragmentation and reassembly of information units called datagrams for transmission over networks with different maximum data unit sizes. In the TCP/IP protocol, in order to properly route packets, it is necessary to use the source IP address and port number and the destination IP address and port number found in the packet header.

For many business enterprises, it has become important to reach customers, vendors, and employees through the Internet. Web-based communication is different from mainframe and client-server arenas. One difference is that HTTP (HyperText Transfer Protocol), an underlying protocol of Web communication, is both connectionless and stateless. This causes a problem for dynamic interactions with the user where a Web system needs to be able to keep track of the user's state during a session involving multiple Web interactions (e.g., Web page requests). Without a way to manage state between Web transactions, the system will forget information about the user and the context of the session. This can be further complicated by the fact that in many large Web systems the user does not interact with the same Web server from transaction to transaction.

Moreover, in Web applications, it is often necessary to provide a persistent or "sticky" connection between a browser (the user) and the Web or database server to which it is connected. A sticky connection allows a server load balancer to direct each client connection in a session to the same server so that all requests from a given client are redirected to the same server and the client remains attached to a single server for the duration of the transaction between the client and the server. Examples of applications that require a sticky connection include shopping baskets, financial transactions, and some forms of interactive games. Because HTTP does not carry any state information for these applications, it is important for the browser to be mapped to the same server for each HTTP request until a user's transaction is complete.

The sticky connection is often controlled by a configurable timer. If the timer is configured on a virtual server, new connections from a client are sent to the same real server that handled the previous client connection, provided that the amount of time between the end of a previous connection from the client and the start of a new connection is within the timer duration. If a session is timed out, the client may be connected to a different real server, thus losing state information.

Current implementations of sticky use the client IP address/TCP port, SSL session ID, or a user's cookies. As described below, each of these methods has drawbacks.

A TCP connection is initialized through a three-way handshake which is used to synchronize the sequence number and acknowledgement numbers of both sides of the connection and exchange segment sizes. The client first sends a TCP segment to the server with an initial sequence number for the connection and maximum segment size. The server sends back a TCP segment containing its chosen initial sequence number, an acknowledgement of the client's sequence number, and a maximum segment size. The client then sends a TCP segment to the server containing an acknowledgement of the server's sequence number. If an acknowledgement is not received within a specified period of time a browser may time out the session.

SSL (secure socket layer) is encryption technology used to provide secure transactions on the Web, such as the transmission of credit card numbers for e-commerce. The SSL protocol uses a combination of public key and symmetric key encryption. An SSL session also begins with an exchange of messages called the SSL handshake. The handshake allows the server to authenticate itself to the client using public key techniques, then allows the client and the server to cooperate in the creation of symmetric keys used for rapid encryption, decryption, and tamper detection during the session that follows. Web sites that use mixed SSL/non-SSL connections create problems for sticky connections. An example of a mixed SSL/non-SSL connection is an online vendor who provides a shopping cart for use in collecting items for purchase while browsing. Since the contents of the shopping cart are not considered confidential, most administrators deploy this area of the site in non-SSL pages. However, at checkout time when confidential information such as the user's credit card number is entered, the vendor switches to a secure SSL connection. Since the SSL session ID is effective only when the server is running SSL, the client may be switched to a different server during the transaction.

The cookie sticky keeps clients directed to the same physical or real server using standard HTTP cookie technology. Cookies are strings passed from servers to browsers using HTTP. After a client has received a cookie as the result of a "set cookie" HTTP command, any server can poll that cookie, providing it knows the structure, with a "get cookie" command. This allows the querying server to positively identify the client as the one that received the cookie earlier. In a server load balancer implementation, this technology may be used to route users back to the same real server based on the cookie the client shows the server load balancer. The cookie sticky typically does not work with SSL since the cookies are encrypted. Furthermore, the cookie can also time out, thus resulting in a new connection being made with possibly a different server.

Sticky may also be implemented using IP addresses. For example, the IP address of a user and the server that the user was connected to initially may be recorded. When a new request comes in from that same user the traffic is directed to the original server. The initial connection may be allocated to a specific server based on the type of application being requested or based on load balancing criteria. There are situations, however, where a client IP address will change, thus, using the IP address to provide a persistent connection will not work. For example, many firewalls translate the network address into one or more IP addresses managed by the firewall. In this way, the firewall can direct traffic to the Internet without actually exposing the IP address used internally by its protected network. The return address is the firewall and the firewall translates the address back to the user's address, and passes the packet along to the protected network. By also translating the port number, the firewall can use the same IP address among multiple users. This allows a network located behind a firewall to make thousands of connections to the Internet with only one IP address. However, with a large network, the firewall may need several IP addresses to distribute the traffic. Also, in the case where there is more than one firewall handling the network traffic, each firewall or an array of firewalls may translate a user's IP address into a different address for each TCP session. Thus, source persistence will not work in situations where the user's IP address changes, such as when the user resides behind a firewall or array of firewalls that use multiple IP addresses.

There is, therefore, a need for a method and system for implementing sticky connections despite the presence of a firewall or other network device that may modify a client IP address.

SUMMARY OF THE INVENTION

A method and system for providing persistent connections based on the natural class of a subnet are disclosed. A method of the present invention generally comprises receiving a request originating from a client for connection to a virtual server and selecting a real server associated with the virtual server for connection with the client based only a natural class of an IP address of a device sending the request. Transmissions originating from the client are forwarded to the selected real server.

A computer program product for providing a persistent connection between a client and a server generally comprises code that receives a request originating from a client for connection to a virtual server and code that selects a real server associated with the virtual sever for connection with the client based only on a natural class of an IP address of a device sending the request. The product further includes code that forwards to the selected real server transmission originating from the client and a computer readable storage medium for storing codes.

In another aspect of the invention a computer system for providing a connection between a client and a server generally comprises a virtual server and a plurality of real servers associated with the virtual server. The system further includes a processor for selecting one of the plurality of real servers for connection to a client based only on a natural class of an IP address of a device sending a request from the client for connection to the virtual server.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of router. Memory can be non-volatile RAM and/or ROM. However, there are many different ways in which memory could be coupled to the system. In an alternative embodiment, a router or switch may be implemented on a general purpose network host machine such as the computer system of FIGS. 1 and 2.

Figure 1:
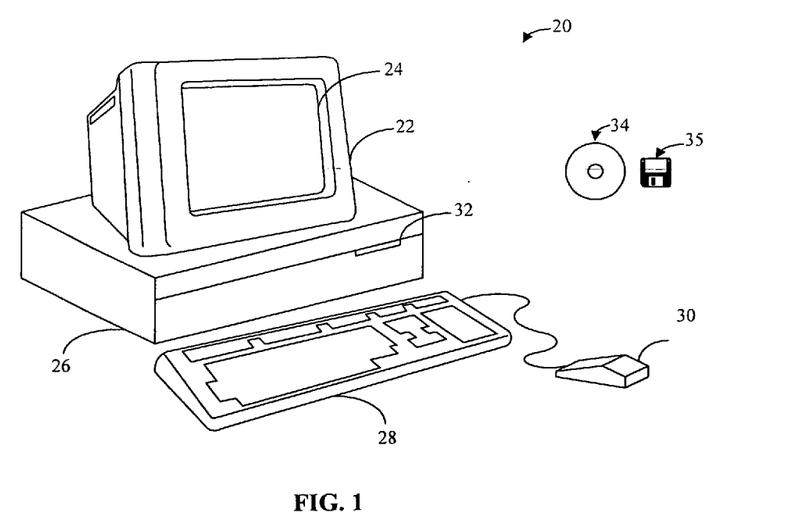
FIG. 1 is a schematic illustrating an example of a computer system that can be utilized to execute software of an embodiment of the present invention.

FIG. 1 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 2) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. A carrier wave (e.g., in a network including the Internet) is an example of a transmission medium.

Figure 2:
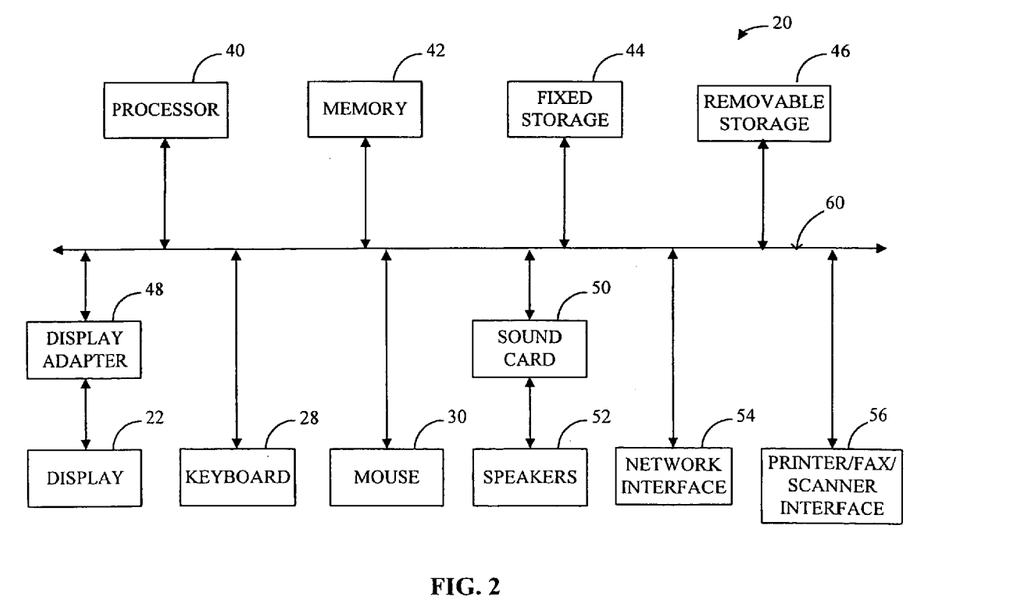
FIG. 2 is a system block diagram of the computer system of FIG. 1.

FIG. 2 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. The computer system may also include inside and outside high speed Local Area Network (LAN) interfaces, for example. The inside interface may be connected to a private network, while the outside interface may be connected to an external network such as the Internet. Preferably, each of these interfaces includes a plurality of ports appropriate for communication with the appropriate media, and associated logic, and in some instances memory. The associated logic may control such communications intensive tasks as packet integrity checking and media control and management. The high speed interfaces are preferably multiport Ethernet interfaces, but may be other appropriate interfaces such as FDDI interfaces. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 2. However, these arrows are only illustrative of one possible interconnection scheme serving to link the subsystems. For example, a local bus may be utilized to connect the central processor 40 to the system memory 42 and display adapter 48. The computer system 20 shown and described herein is only one example of a computer system suitable for use with the invention. Other computer architectures having different configurations of subsystems may also be utilized. Communication between computers within the network is made possible with the use of communication protocols, which govern how computers exchange information over a network.

Internet service providers (ISPs) and other Internet content providers commonly maintain Web sites for their customers. This service is called Web hosting. Each Web site is associated with a Web host. A Web host may be a physical Web server (real server) or a logical entity, referred to as a virtual Web host (virtual server). A virtual server associated with a large Web site may span multiple real servers. Conversely, several virtual servers associated with small Web sites may share a single real server. In either case, each virtual server provides the functionality of a single real server in a way that is transparent to the client. The Web sites hosted on a virtual Web host may share server resources, such as CPU cycles and memory, but are provided with all of the services of a dedicated Web server. A virtual server has one or more public virtual IP address that clients use to access content on the virtual server. The virtual IP address is an IP address which the outside world, including the rest of the Internet, uses to access an Internet site implemented on either one or some combination of the physical machines which make up the group of real servers. The individual identities and IP addresses of the individual real servers are not evident to the user. A Web host is uniquely identified by its public virtual IP address.

Figure 3:
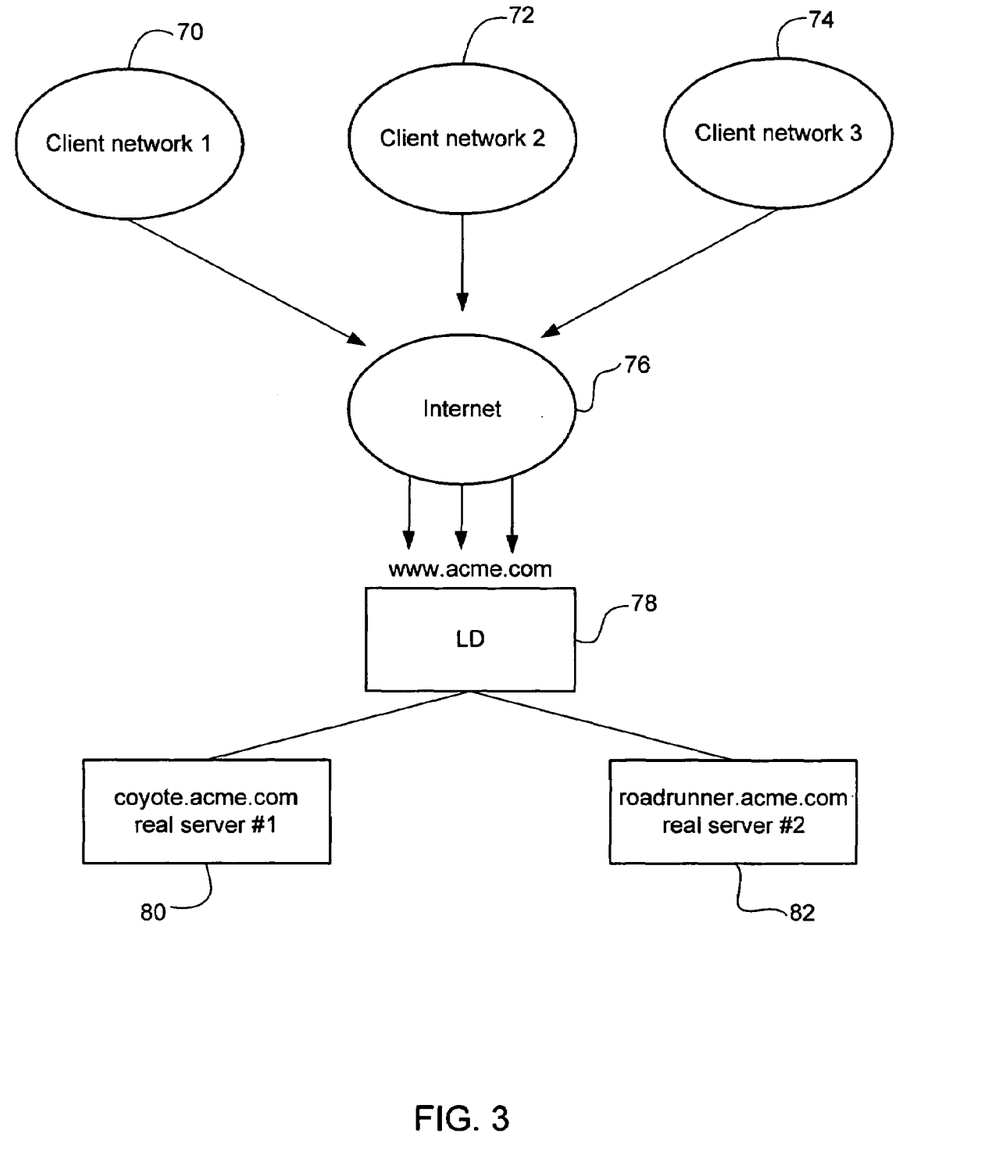
FIG. 3 is a schematic illustrating a local director positioned to direct traffic to two real servers.

FIG. 3 is a block diagram of a network segment which includes a plurality of client networks 70, 72, 74, a local director 78, and two real servers 80, 82. The user who is accessing an Internet site via the local director 78 is referred to as the client and the group of machines associated with the local director are referred to as servers. In certain applications, however, the group of machines associated with the local director 78 may be considered the client and the device on the other side of the local director considered the server. A plurality of virtual machines may be implemented on different port numbers on certain of the real or physical machines. Other physical machines may be configured to service only one specific domain name. Each virtual machine may allocate connections to a plurality of physical machines, or on a single physical machine if desired. The real servers may include any number or type of servers. The real servers 80, 82 may be, for example, TCP based servers acting as World Wide Web servers, FTP servers, mail servers, news servers, database servers, or Telnet servers. It should be noted that, although the embodiment described establishes connections to the Internet using TCP/IP, the present invention may also be used in conjunction with other protocols such as UDP (User Datagram Protocol).

When a router receives a request to access an Internet site supported by the local director 78 by a domain name (e.g., www.acme.com), that domain name is mapped to the IP address of the Internet site by a DNS (domain name service) server. DNS translates a name to a numeric address and inserts it into a message for transport. The DNS server does not provide a real IP address of a real machine, but instead provides a virtual IP address of a virtual machine which is implemented on the local director 78. The local director 78 then receives all packets sent to virtual IP addresses implemented on the local director. When a packet is received by the local director 78 from the communication path to the virtual server, the packet is processed by a protocol stack through a series of layers. The packet comes in through a physical layer. Typically, the physical layer implements Ethernet or some other well known protocol. Packets are passed up to an IP layer and are processed according to the IP protocol. The TCP/IP protocol resolves the source IP address, the source port number, the destination IP address, and the destination port number, which are all found in the IP header.

The local director 78 serves as a front end to the group of real servers 80, 82. Requests from external sites on the Internet 76 are routed through the local director 78 which performs server load balancing (SLB) to determine which server or group of servers should receive the request. The local director 78 may include a service manager (such as CASA, developed by Cisco Systems, Inc. San Jose, Calif.) which makes the load balancing decisions based on application availability, server capacity, and load distribution, for example. Load balancing algorithms such as round robin, least connections, dynamic feedback, or other load balancing applications may be used, as well known by those skilled in the art. The local director 78 may further include one or more forwarding agents which forward packets based on instructions received from the service manager. The local director may include a real-time embedded operating system (RTOS) such as Finesse developed by Cisco Systems, Inc. of San Jose, Calif., for example. The local director may be configured as described in U.S. patent application Ser. No. 09/347,034, filed Jul. 2, 1999, which is incorporated herein by reference in its entirety.

It is to be understood that the local director 78 may be different than described herein or the server load balancing may be accomplished with a device other than a local director, without departing from the scope of the invention.

As further described below, the present invention provides a system and method for providing a persistent (sticky) connection between a user (client) and one of the real servers 80, 82 that the user is initially directed to by the local director 78. In order to maintain a persistent connection between the user and the real server, transmissions received from the same natural class subnet (as identified by the IP address) are sent to the same real server.

Figure 4:
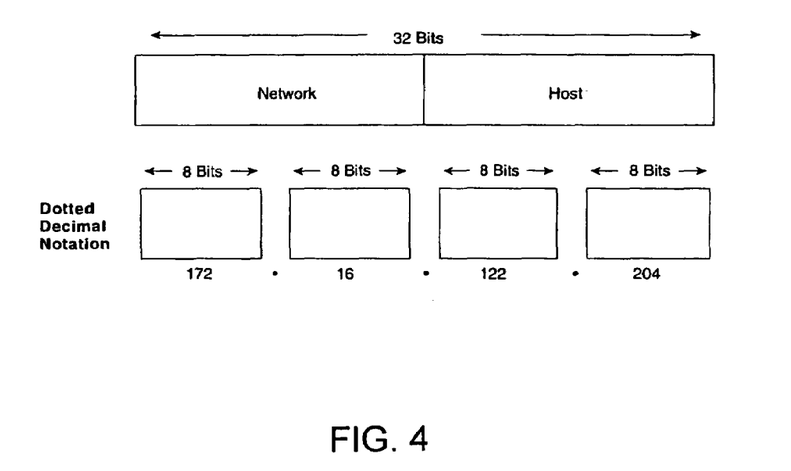
FIG. 4 is a diagram illustrating the basic format of an IP address.

As previously discussed, the Internet Protocol (IP) is a network layer protocol that contains addressing information. Each IP address has specific components and follows a basic format. These IP addresses can be subdivided and used to create addresses for subnetworks, as described below. Each host on a TCP/IP network is assigned a unique 32-bit logical address that is divided into two main parts: the network number and the host number. The network number identifies a network and is assigned by the Internet Network Information Center (InterNIC) if the network is to be part of the Internet. An Internet Service Provided (ISP) can obtain blocks of network addresses from the InterNIC and can itself assign address space as necessary. The host number identifies a host on a network and is assigned by the local network administrator. The 32-bit IP address is grouped eight bits at a time, separated by dots, and represented in decimal format. Each bit in the octet has a binary weight. The minimum value for an octet is 0 and the maximum value for an octet is 255. FIG. 4 illustrates the basic format of an IP address.

Figure 5:
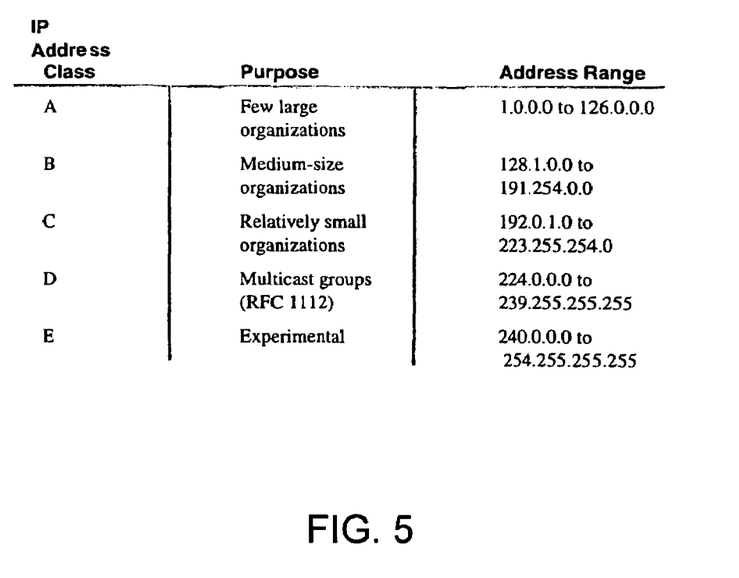
FIG. 5 is a table listing reference information about IP address classes.

IP addressing supports five different address classes A, B, C, D, and E. Only classes A, B, and C are available for commercial use. The left-most (high-order) bits indicate the network class (natural class). The class of an address can be determined by examining the first octet of the address. FIG. 5 shows the range of possible values for the first octet of address classes currently used on the Internet. In an IP address of 172.31.1.2, for example, the first octet is 172. Because 172 falls between 128 and 191, 172.31.1.2 is a class B address. It is to be understood that the system and method described herein may be applied to additional classes or different types of classes without departing from the scope of the invention.

IP networks can be divided into smaller networks called subnetworks (or subnets). Subnets are under local administration. As such, the outside world sees an organization as a single network and has no detailed knowledge of the organization's internal structure. A network address can be broken up into many subnetworks. For example, 172.16.1.0, 172.16.2.0, 172.16.3.0, and 172.16.4.0 are all subnets within network 172.16.0.0. A subnet address is created by borrowing bits from the host field and designating them as the subnet field. The number of borrowed bits varies and is specified by a subnet mask. Subnet masks use the same format and representation technique as IP addresses. The subnet mask, however, has binary is in all bits specifying the network and subnetwork fields, and binary 0s in all bits specifying the host field.

In order to maintain a sticky connection between the client and real server, the local director 78 looks only at the natural class of the IP address. Thus, transmissions originating from a source with the address 172.16.1.0, 176.16.2.0, 172.16.3.0, or 172.16.4.0, are all sent to the same real server. Therefore, even if a firewall or other device (e.g., router, proxy server) located between the host and server changes the IP address of the client, it will still be sent to the same real server since the new IP address will still have the same natural class (i.e., first octet).

The following command may be used, for example, so that all connections to a virtual server that originate from client addresses with the same natural class are sent to the same real server:

sticky<vid><min>[nc-subnet]

where:

<vid> is the virutual ID (e.g., www.acme.com);

<min> is the number of minutes that the sticky connection is to last; and

[nc-subnet] is the natural class to which the sticky connection is applied (e.g., 172)

If this natural class subnet required is turned on, all connections to the specified virtual server that originate from client addresses within that subnet are sent to the same real server to create a sticky connection.

Figure 6:
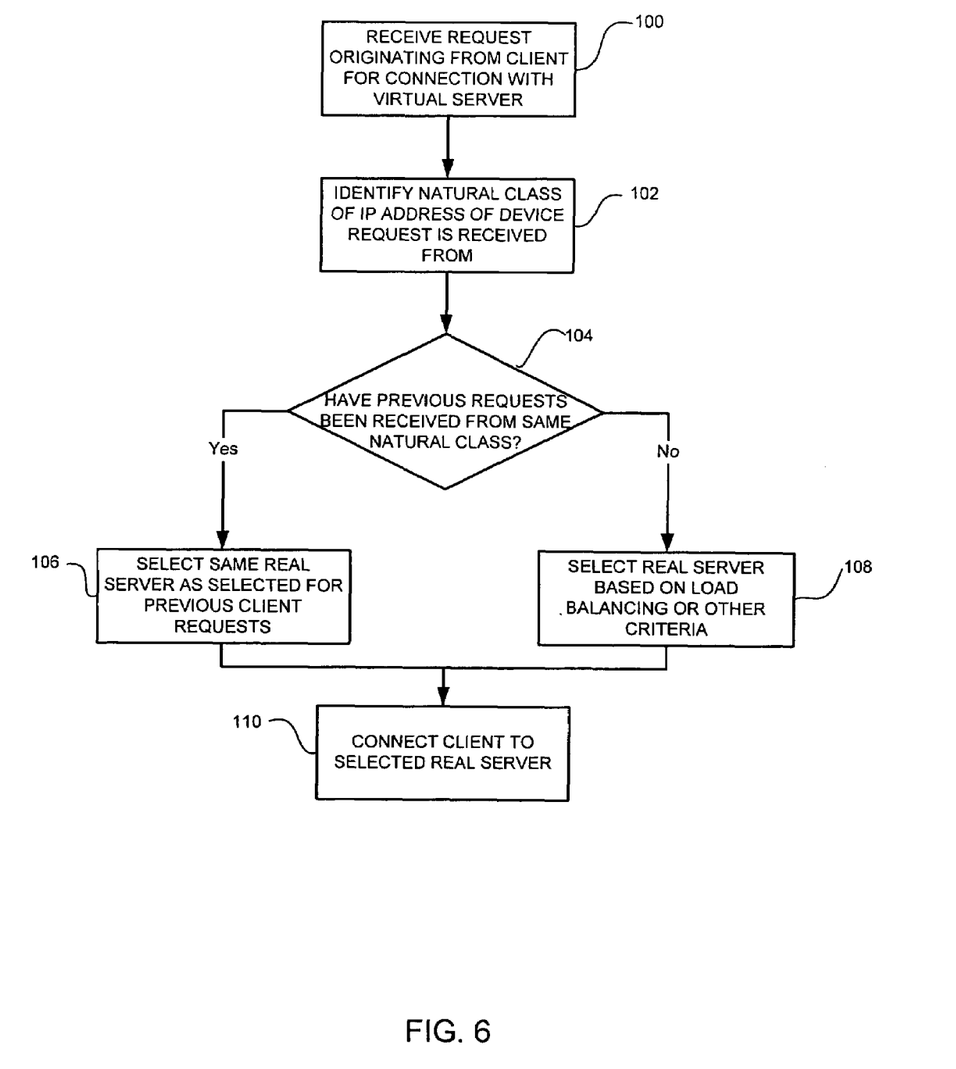
FIG. 6 is a flowchart illustrating a method for creating persistent connections.

FIG. 6 is a flowchart illustrating a process for creating a sticky connection. The load director (or other load balancing or routing device) first receives a request originating from a client for connection with a virtual server (step 100). The load director identifies the natural class from the IP address of the device from which the request is received (step 102). If the local director has received and sent out connection requests from the same device or other devices having the same natural class, the local director selects the same real server for connection with the client (steps 104 and 106). If the local director has not yet received requests from any devices with the same natural class, the local director selects one of the real servers based on load balancing or other criteria (steps 104 and 108). The client is then connected to the selected real server (step 110). The local director may store information on previous connections in a table which is updated each time a connection is made with a new natural class. It is to be understood that the local director may receive a request directly from a client in which case the client is the device from which the request is received and the local director looks at the IP address of the client to determine the natural class.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing a persistent connection between a client and a real server, the method comprising:
   providing a local director in communication with a plurality of clients and two or more real servers, said plurality of clients configured for communication with said two or more real servers through said local director;
   receiving at said local director a request originating from a first client of said plurality of clients for connection to a virtual server implemented on the local director;
   identifying a natural class of an IP address of said first client;
   determining if the local director has received and sent out connection requests from any client of said plurality of clients, having the same natural class as said first client by searching a table stored on the local director and identifying previous connections created between the local director and said two or more real servers;
   if the local director has received and sent out a connection request to one of said real servers from any client having the same natural class as said first client, selecting the same real server for connection with said first client,
   wherein selecting a real server comprises selecting the same real server for all clients having the same natural class subnet;
   if the local director has not received and sent out a connection request to one of said real servers from any client having the same natural class as said first client, selecting one of said real servers based on load balancing; and
   forwarding to the selected real server transmissions originating from said first client;
   wherein receiving a request comprises receiving a request from a firewall and wherein the IP address of a device sending the request is the IP address of the firewall.

2. The method of claim 1 wherein the request is an HTTP request.

3. A computer program product for providing a persistent connection between a client and a server, the client configured for communication with two or more real servers through a local director, the product comprising:
   code that receives a request at said local director originating from a first client for connection to a virtual server implemented on the local director;
   code that identifies a natural class of an IP address of said first client;
   code that determines if the local director has received and sent out connection requests from any client of said plurality of clients, having the same natural class as said first client by searching a table stored on the local director and identifying previous connections created between the local director and said two or more real servers;
   if the local director has received and sent out a connection request to one of said real servers from any client having the same natural class as said first client, code that selects the same real server for connection with said first client, wherein the code that selects a real server comprises code that selects the same real server for all clients having the same natural class subnet;
   code that selects one of said real servers based on load balancing if the local director has not received and sent out a connection request to one of said real servers from any client having the same natural class as said first client; and
   code that forwards to the selected real server transmission originating from said first client, wherein the code that receives a request comprises code that receives a request from a firewall and wherein the IP address of a device sending the request is the IP address of the firewall; and
   a computer-readable storage medium for storing the codes.

4. The computer program product of claim 3 wherein the computer-readable medium is selected from a group consisting of CD-ROM, floppy disk, tape, flash memory, system memory, and hard drive.

5. The method of claim 1 further comprising updating said table each time a connection is made between the local director and said two or more real servers with a new natural class.

6. The method of claim 1 wherein identifying a natural class comprises identifying a subnet mask and wherein the selection of the real server is based on the identified subnet mask.

7. The method of claim 1 further comprising updating entries in said local director table when a connection is made with a new natural class.

8. A system for providing a persistent connection between a client and a real server, the client configured for communication with two or more real servers through a local director, the method comprising:
   means for receiving at said local director a request originating from a first client for connection to a virtual server implemented on the local director, the local director in communication with two or more real servers,
   means for identifying a natural class of an IP address of said first client;
   means for determining if the local director has received and sent out connection requests from any client of said plurality of clients, having the same natural class as said first client by searching a table stored on the local director and identifying previous connections created between the local director and said two or more real servers;
   if the local director has received and sent out a connection request to one of said real servers from said any client having the same natural class as said first client, selecting the same real server for connection with said first client;
   if the local director has not received and sent out a connection request to one of said real servers from any client having the same natural class as said first client, selecting one of said real servers based on load balancing, wherein selecting a real server comprises selecting the same real server for all clients having the same natural class subnet; and means for forwarding to the selected real server transmissions originating from said first client;

wherein means for receiving a request comprises means for receiving a request from a firewall and wherein the IP address of a device sending the request is the IP address of the firewall.

9. The system of claim 8 wherein means for selecting a real sever for connecting with the client comprises selecting the same real server for requests received from IP addresses having the same natural class subnet.

* * * * *